US010964052B2

(12) United States Patent
Karlsson (10) Patent No.: US 10,964,052 B2
(45) Date of Patent: Mar. 30, 2021

(54) METHOD AND COMPUTER VISION SYSTEM FOR HANDLING OF AN OPERABLE TOOL

(71) Applicant: WIRETRONIC AB, Vänersborg (SE)

(72) Inventor: Sören Karlsson, Vänersborg (SE)

(73) Assignee: WIRETRONIC AB, Vänersborg (SE)

(*) Notice: Subject to any disclaimer, the term of this patent is extended or adjusted under 35 U.S.C. 154(b) by 51 days.

(21) Appl. No.: 16/605,372

(22) PCT Filed: Apr. 19, 2018

(86) PCT No.: PCT/SE2018/050395
§ 371 (c)(1),
(2) Date: Oct. 15, 2019

(87) PCT Pub. No.: WO2018/194508
PCT Pub. Date: Oct. 25, 2018

(65) Prior Publication Data
US 2020/0051275 A1  Feb. 13, 2020

(30) Foreign Application Priority Data
Apr. 20, 2017 (SE) .................................. 1750463-0

(51) Int. Cl.
*G06T 7/73* (2017.01)
*G06F 16/432* (2019.01)
(Continued)

(52) U.S. Cl.
CPC .............. *G06T 7/73* (2017.01); *G06F 3/0488* (2013.01); *G06F 3/04815* (2013.01);
(Continued)

(58) Field of Classification Search
CPC ............. G06T 7/73; G06T 2207/30164; G06F 16/434; G06F 16/583; G06F 3/04815;
(Continued)

(56) References Cited

U.S. PATENT DOCUMENTS 4,351,692 A * 9/1982 Ouellette .......... B29C 66/43121
156/443
6,568,070 B1 * 5/2003 Eaton ........................ B25B 9/00
29/739

(Continued)

FOREIGN PATENT DOCUMENTS

EP       1739572 A1    1/2007
WO    2014186840 A1   11/2014

OTHER PUBLICATIONS

PCT International Search Report and Written Opinion dated Jul. 6, 2018 for International Application No. PCT/SE2018/050395, 13 pages.

(Continued)

*Primary Examiner* — Ali Bayat
(74) *Attorney, Agent, or Firm* — RMCK Law Group, PLC (57) ABSTRACT

The present disclosure generally relates to a novel method of selecting a suitable tool for use in handling an operable tool in relation to e.g. an electrical vehicle contact. The present disclosure also relates to a corresponding system and a computer program product.

16 Claims, 5 Drawing Sheets

(51) Int. Cl.
*G06F 16/583* (2019.01)
*G06F 3/0481* (2013.01)
*G06F 3/0488* (2013.01)
*G06K 9/00* (2006.01)
*G06K 9/62* (2006.01)

(52) U.S. Cl.
CPC ........ *G06F 3/04817* (2013.01); *G06F 16/434* (2019.01); *G06F 16/583* (2019.01); *G06K 9/00671* (2013.01); *G06K 9/6267* (2013.01); *G06T 2207/30164* (2013.01)

(58) Field of Classification Search
CPC .............. G06F 3/04817; G06F 3/0488; G06K 9/00671; G06K 9/6267; G06K 9/62; G09B 5/02; G09B 19/003; G09B 19/24
USPC ......................................................... 382/152
See application file for complete search history.

(56) References Cited

U.S. PATENT DOCUMENTS

| | | | |
|---|---|---|---|
| 7,249,875 B1* | 7/2007 | Roach | B60Q 1/0005 362/369 |
| 2003/0171029 A1* | 9/2003 | Yamada | H01R 13/74 439/553 |
| 2003/0188424 A1* | 10/2003 | Eaton | H01R 43/22 29/762 |
| 2006/0240862 A1* | 10/2006 | Neven | G06K 9/228 455/550.1 |
| 2012/0075343 A1 | 3/2012 | Chen et al. | |
| 2012/0165071 A1* | 6/2012 | Hsu | G06F 3/04817 455/557 |
| 2015/0130486 A1* | 5/2015 | Kleindienst | G01R 31/001 324/750.26 |
| 2017/0126428 A1* | 5/2017 | Paryani | G05B 15/02 |

OTHER PUBLICATIONS

Extended European Search Report dated Dec. 15, 2020 for European Patent Application No. 18786946.6, 7 pages.

\* cited by examiner

METHOD AND COMPUTER VISION SYSTEM FOR HANDLING OF AN OPERABLE TOOL

CROSS-REFERENCE TO RELATED APPLICATIONS

This application is a 371 U.S. National Stage of International Application No. PCT/SE2018/050395, filed Apr. 19, 2018, which claims priority to Swedish Patent Application No. 1750463-0, filed Apr. 20, 2017. The disclosures of each of the above applications are incorporated herein by reference in their entirety.

TECHNICAL FIELD

The present disclosure generally relates to a novel method of selecting a suitable tool for use in handling an operable tool in relation to e.g. an electrical vehicle contact. The present disclosure also relates to a corresponding system and a computer program product.

BACKGROUND

In many industrial fields, for example, automotive, aircraft and appliance, the use of a great number of removably connected electrical connector has become very prevalent. Usually the disconnect feature takes the form of a pair of terminal blocks in which male and female terminal contacts are arranged such that they can be telescopically engaged and disengaged.

The terminal blocks typically comprise supporting bodies of dielectric or insulating material to support and carry a plurality of terminal pins or posts. The supporting bodies are provided with through openings in which the pins or posts are engaged. The most practical and widely-used means for retaining the pins or posts in their related openings in the supporting bodies involves the inclusion of a stop flange in the opening in the supporting body, a cooperating stop shoulder on the pin or post to engage one side of the stop flange and an expansible element on the pin to engage the other side of the stop flange.

As a result of this relationship of parts, it is frequently impossible to remove such pins or posts from their carrier bodies without damage to the bodies, or without the aid of especially constructed removal tools which can be inserted in the annulus normally occurring between the pin and the wall of the opening in which it is engaged and which will collapse or compress the expansible element, making it possible to remove the pin.

With the constant development within the automotive industry and an ever increasing interest in miniaturization, new and even more advanced electrical connector are continuously developed, e.g. for different vehicle models and from different manufactures. Consequently, it will be almost impossible even for a skilled service engineer to have knowledge of which removal tools to select and use to ensure that the electrical contact is not damaged.

Accordingly, there seems to be room for means for assisting e.g. the service engineer in the process of selecting and using the correct tool for removal of terminal pins or posts comprised with the above mentioned electrical connector.

SUMMARY

According to an aspect of the present disclosure, it is therefore provided a method for handling of an operable tool adapted for removal of a terminal pin or post comprised with an automotive electrical connector, comprising the steps of acquiring, using a camera comprised with a first electronic device, an image or a video of the electrical connector, applying a computer implemented machine vision identification process adapted to determine a type of the electrical connector, wherein the type of electrical connector is selected from a plurality of predetermined types of electrical connectors, displaying, using a display screen comprised with the first electronic device, information relating to a result of the machine vision identification process regarding the identified type of electrical connector, forming a graphical instruction for the identified type of electrical connector, and displaying, using the display screen comprised with the first electronic device, the graphical instruction for a user for handling the operable tool to remove the pin or post comprised with the electrical connector.

The present disclosure is based upon the realization that there would be advantageous to make use of an electronic device comprising a camera and a computer implemented machine vision identification process for assisting e.g. a service engineer in identifying what type of electrical connector that the service engineer is to handle, and at the same time provide the service engineer with a graphical instruction comprising information relating to what tool to use and how to use that tool for removal of the pin or post comprised with the electrical connector. Accordingly, rather than having to have "advanced prior knowledge" of different types of electrical connectors, the present disclosure will in an automated manner provide the adequate information needed for a user/service engineer in completing the pin/post removal task.

In a possible embodiment of the present disclosure, the formation of the graphical instruction comprises selecting one of a plurality of predetermined graphical instructions. Accordingly, in some embodiments the first electrical device may possibly comprise previously stored graphical instructions that the process is selecting based on the outcome of the computer implemented machine vision identification process. However, it may as an alternative, or also, be possible to request the graphical instruction from a further source of information, such as e.g. a remotely located database.

Preferably, the graphical instruction comprises at least one of an image and a video sequence instructing the user for handling the operable tool. Possibly the graphical instruction may for example comprise a combination of images and illustrations of what removal tool to select and how to use that specific tool for removing the pin or post comprised with the electrical connector.

In an embodiment of the present disclosure, the computer vision system is further adapted to determine identifiable electrical connector features from the captured image or video of the connector, and to compare the determined identifiable features with electrical connector features pre-stored in a database. The determination and comparison process may in some embodiments comprise a machine learning component, e.g. specifically trained towards electrical connectors for the automotive industry. The determination and comparison process will be further elaborated below in the detailed description of the present disclosure.

In a possible embodiment of the present disclosure the second electronic device is a cloud server, typically connected to the first electronic device using a network connection, such as the Internet. The expression cloud server should be interpreted broadly and understood to include any type of remotely located (e.g. "offsite") server connected to the first electronic device using the network connection. Such a server may in some embodiments be configured with an in comparison to the first electronic device greater computational power, whereby the processing of the identifiable electrical connector features for determining the type of electrical connector may be performed quicker as compared to if the processing was performed by the first electronic device.

However, it should be understood that it in some embodiments may be desirable to perform the processing of the identifiable electrical connector features using e.g. a control unit comprised with the first electronic device. As would be readily understood by the skilled person, such an implementation may in some situations be advantageous since this will remove the direct necessity of connecting the first electronic device to e.g. the Internet. The first electronic device may thus function as a standalone device, also functioning in case of a lacking Internet connection.

According to an aspect of the present disclosure, there is further provided a computer vision system adapted to assist in handling of an operable tool adapted for removal of a terminal pin or post comprised with an automotive electrical connector, wherein the computer vision system comprises a first electronic device, the first electronic device comprising a camera, a display screen and a control unit, wherein the computer vision system is adapted to acquire, using a camera comprised with a first electronic device, an image or a video of the electrical connector, apply a computer implemented machine vision identification process adapted to determine a type of the electrical connector, wherein the type of electrical connector is selected from a plurality of predetermined types of electrical connectors, display, using a display screen comprised with the first electronic device, information relating to a result of the machine vision identification process regarding the identified type of c electrical connector, form a graphical instruction for the identified type of electrical connector, and display, using the display screen comprised with the first electronic device, the graphical instruction for a user for handling the operable tool to remove the pin or post comprised with the electrical connector. This aspect of the present disclosure provides similar advantages as discussed above in relation to the previous aspects of the present disclosure.

Advantageously, the first electronic device is a handheld electronic device, such as a mobile phone or a tablet. Accordingly, the service engineer may for example make use of the camera typically comprised with his mobile phone or tablet for acquiring the image or video of the electrical connector.

Correspondingly, in some embodiments of the present disclosure the display screen typically comprised with the mobile phone or the tablet for displaying the result of the machine vision identification process (i.e. the identified type of electrical connector) as well as the graphical instruction for removal of the pin or post comprised with the electrical connector.

According to a further aspect of the present disclosure, there is provided a computer program product comprising a non-transitory computer readable medium having stored thereon computer program means for controlling a computer vision system adapted assist in handling of an operable tool adapted for removal of a terminal pin or post comprised with an automotive electrical connector, wherein the computer vision system comprises a first electronic device, the first electronic device comprising a camera, a display screen and a control unit, wherein the computer program product comprises code for acquiring, using a camera comprised with a first electronic device, an image or a video of the electrical connector, code for applying a computer implemented machine vision identification process adapted to determine a type of the electrical connector, wherein the type of electrical connector is selected from a plurality of predetermined types of electrical connectors, code for displaying, using a display screen comprised with the first electronic device, information relating to a result of the machine vision identification process regarding the identified type of c electrical connector, code for forming a graphical instruction for the identified type of electrical connector, and code for displaying, using the display screen comprised with the first electronic device, the graphical instruction for a user for handling the operable tool to remove the pin or post comprised with the electrical connector. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

In summary, the present disclosure generally relates to a novel method of selecting a suitable tool for use in handling an operable tool in relation to e.g. an electrical vehicle contact. The present disclosure also relates to a corresponding system and a computer program product.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Figure 1:
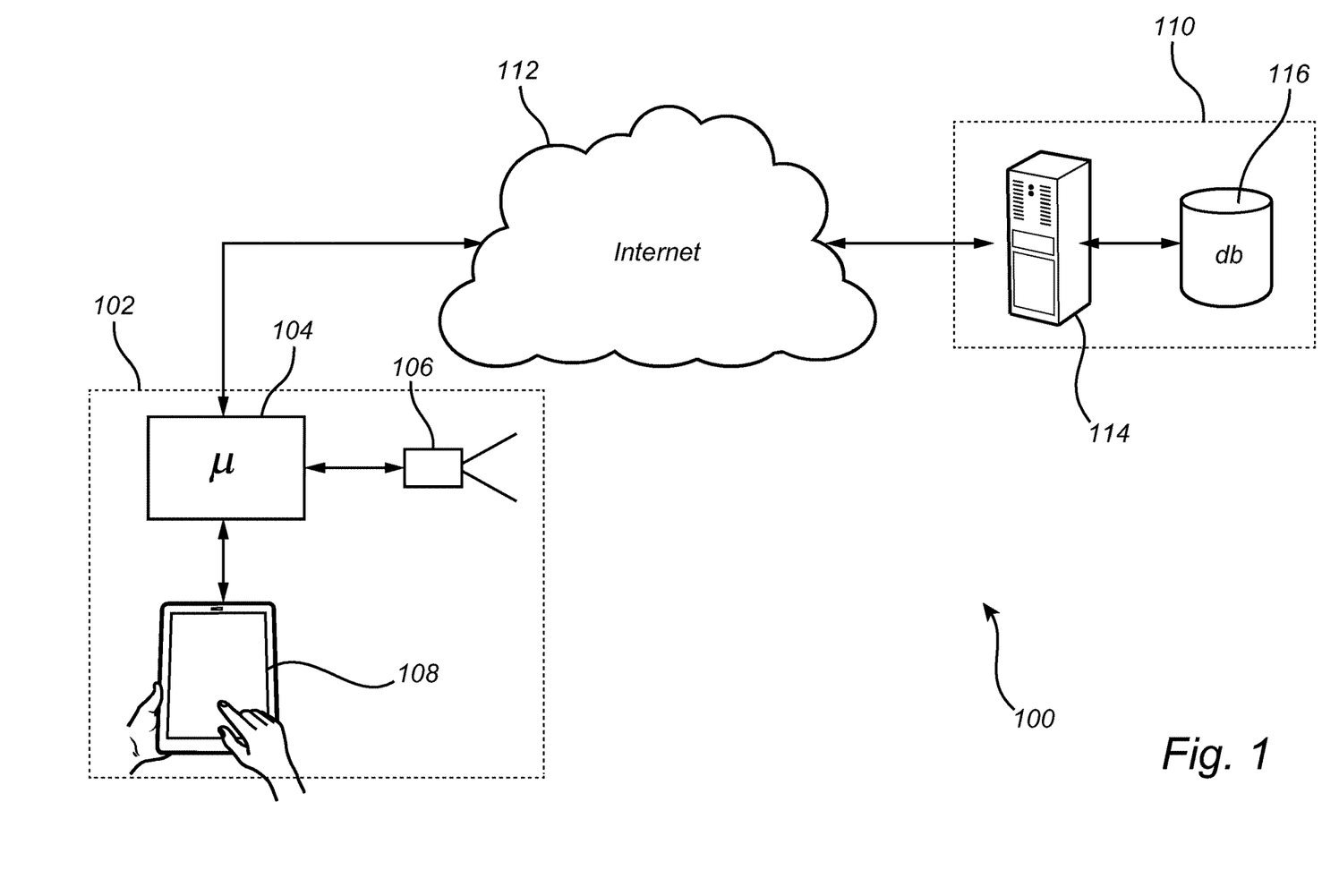
FIG. 1 conceptually illustrates an operational process of a computer vision system according to a currently preferred embodiment of the present disclosure.

Turning now to the drawings and to FIG. 1 in particular there is schematically illustrated a conceptual illustration of a computer vision system 100 adapted to assist in handling of an operable tool adapted for removal of a terminal pin or post comprised with an automotive electrical connector. The exemplified computer vision system 100 comprises a first electronic device 102, for example being a handheld electronic device such as a mobile phone or a tablet. The first electronic device 102 in turn comprises a control unit 104, a camera 106 and a display screen 106. The camera 106 and the display screen 106 are arranged in communication with the control unit 104.

Preferably and as is apparent for the skilled person, the first electronic device 102 as shown in FIG. 1 further comprises means for WLAN/Wi-Fi communication and/or for telecommunication communication. Further hardware elements are of course possibly comprised with the first electronic device. It should furthermore be noted that the invention may be applicable in relation to any other type of first electronic devices, such as a smart watch, a laptop or any other type of present or future similarly configured device.

In addition, the control unit 104 may include a microprocessor, microcontroller, programmable digital signal processor or another programmable device. The control unit 104 may also, or instead, each includes an application specific integrated circuit, a programmable gate array or programmable array logic, a programmable logic device, or a digital signal processor. Where the control unit 104 includes a programmable device such as the microprocessor, microcontroller or programmable digital signal processor mentioned above, the processor may further include computer executable code that controls operation of the programmable device.

In addition to the above, the computer vision system 100 may in some embodiments (as is exemplified in FIG. 1) further comprises a second electronic device 110, for example connected to the first electronic device 102 using a network, such as the Internet 112, allowing the first electronic device 102 to communicate and exchange information with the e.g. remotely located second electronic device 110. The second electronic device 110 may in some embodiments comprise a server 114, having a thereto connected remote database 116. The server/database 114/116 may for example be implemented as a so called cloud server. It should however be noted that the inclusion of the second electronic device 110 may be optional for the present disclosure, thus allowing the computer vision system 100 to solely comprise the first electronic device 102 and its thereto comprised components (functioning as e.g. a standalone unit). Alternatively, the second electronic device 110 may be arranged locally, e.g. at the same site as where the first electronic device 102 is located/used.

Turning now to FIGS. 2A-2D, illustrating an example of operating the computer vision system 100. Specifically, in FIG. 2A a user/service engineer is shown to use a tablet 200 (defining the first electronic device 102). For example an application (App) being executed at the tablet 200 comprises a graphical user interface (GUI) adapted to instruct the user/service engineer to take an image or video of an automotive electrical connector 202, using the camera comprised with the tablet 200.

As discussed above, the electrical connector 202 comprises a supporting body of a dielectric or insulating material and adapted to support/carry a plurality of terminal pins or posts 204. The plurality of terminal pins or posts 204 are removably fitted within the body, and may be extracted or removed from the body using a specifically designed removal tool 206 (as will be shown in FIG. 2C).

Figure 2A:
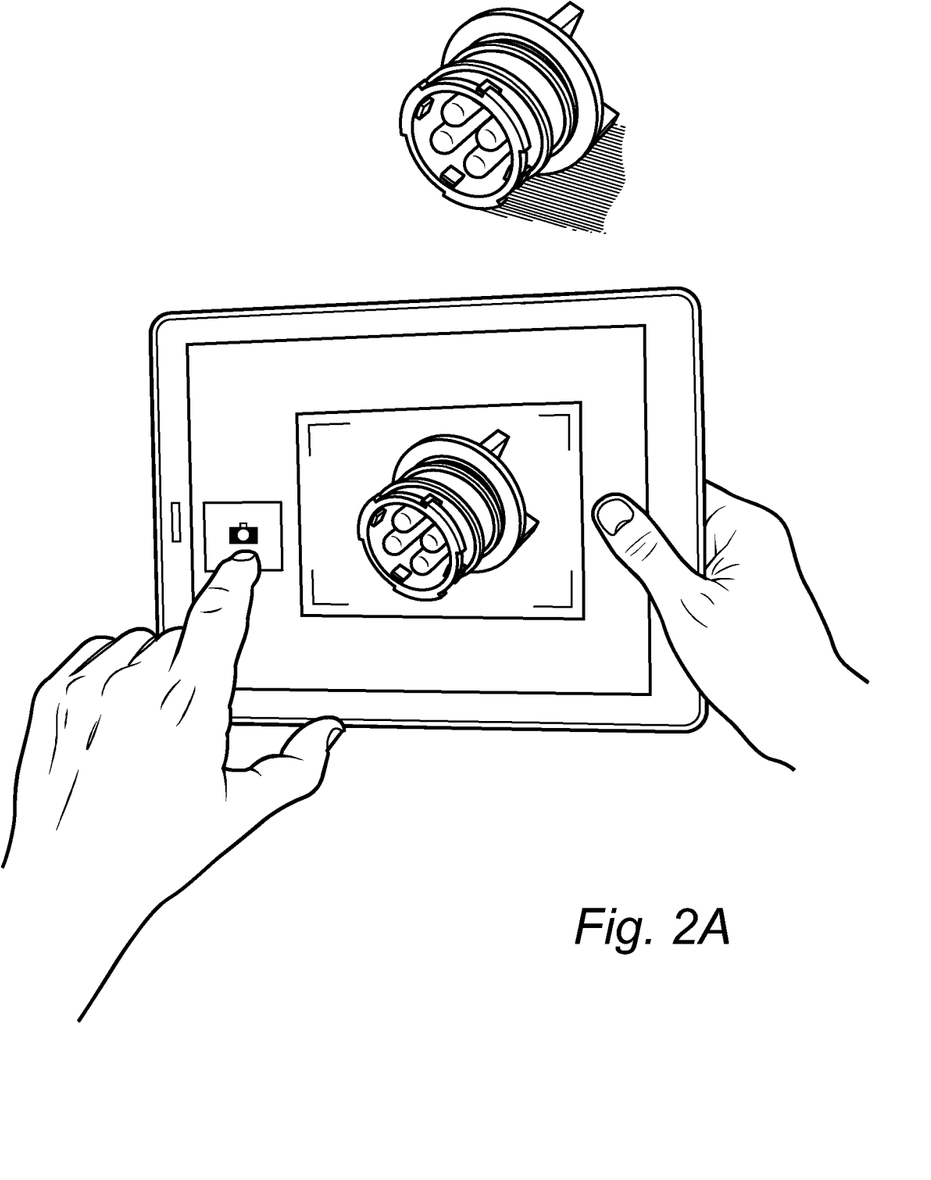
FIGS. 2A-2D illustrates an example of a set of graphical illustrations provided to the user using a handheld electronic device for pin or post removal.

Once the image/movie of the electrical connector 202 has been acquired, the image/movie of the electrical connector 202 is processed for determining electrical connector specific features that may be used in an identification process. Such features may for example comprise dimensional relations between width and height of the electrical connector 208, a relationship and/or number of terminal pins or posts 204 comprised with the electrical connector 202, etc. The electrical connector specific features may in one embodiment be determined using the tablet 200, or may alternatively in another embodiment be determined using the server 114. It may of course be possible to allow some portion of the determination to take place at the tablet 200 and another part of the determination to take place at the server 114.

Figure 2B:
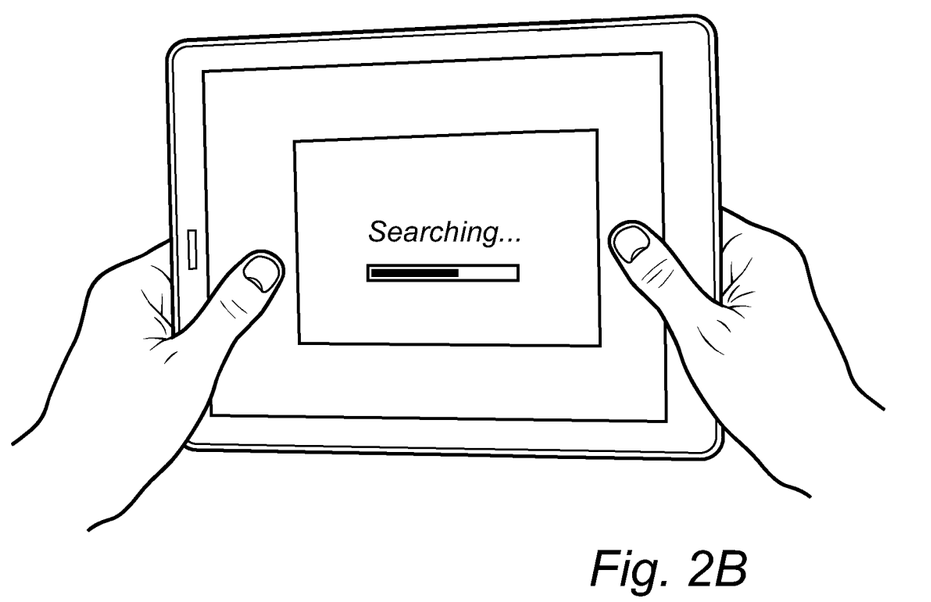

In the illustrated embodiment as shown in FIG. 2B, the server 114 will apply a machine vision identification process to the electrical connector specific features for determining what which type of electrical connector 202 the user has captured an image/movie of. The machine vision identification process may in some embodiments of the present disclosure at least in part comprise a machine learning process to determine the type of the electrical connector 202. It should be understood that the machine learning process may be either of an unsupervised machine learning process or a supervised machine learning process. The machine learning process may typically employ a previously stored collection of training data relating to a plurality of different electrical connectors for comparison and determination of the type of the electrical connector. Furthermore, it may alternatively be possible to use at least one of a convolutional neural network (CNN) and a recurrent neural network (RNN), such as a long short-term memory (LSTM) neural network for determining the type of electrical connector. The training data have typically been previously acquired by a previous process of capturing images/movies of a plurality of types of electrical connectors.

Figure 2C:
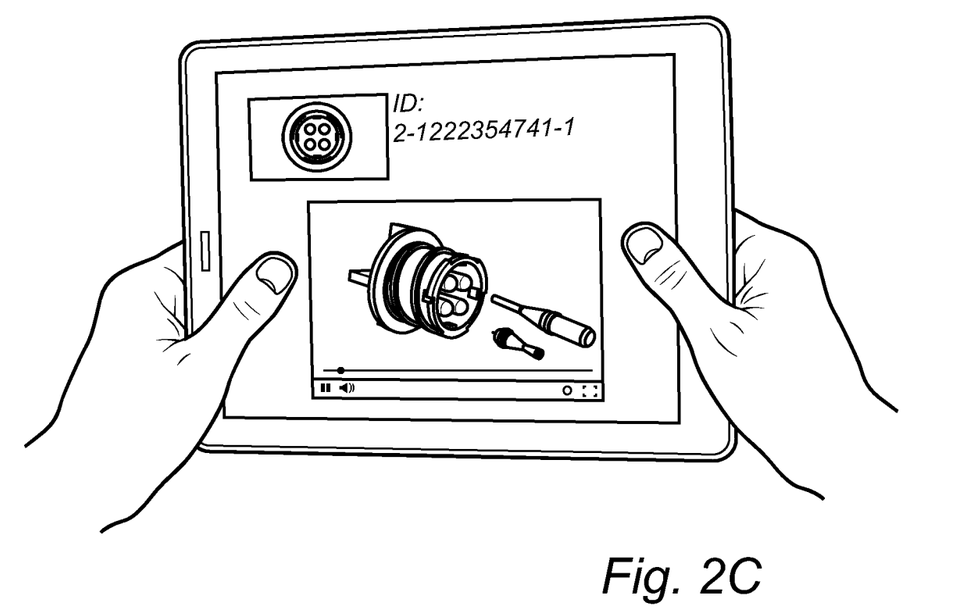

Once the type of electrical connector has been determined, by the server 114 as discussed above or alternatively using a machine vision identification process implemented by the mentioned App (or a combination thereof), the result of the determination is displayed, as shown in FIG. 2C, within the GUI provided at the tablet 200. The result may for example comprise an identification code 208 for the electrical connector 202. In addition, a graphical instruction 210 is formed based on the determined type of the electrical connector 202, comprising information to the user/service engineer on what type of removal tool 206 to select and how to use the selected removal tool 206 for successful removal of the pins or posts 204 comprised with the electrical connector 202. In one embodiment the instruction is formed based on information that has been previously stored at the database 116, to be subsequently communicated to the tablet 200.

Figure 2D:
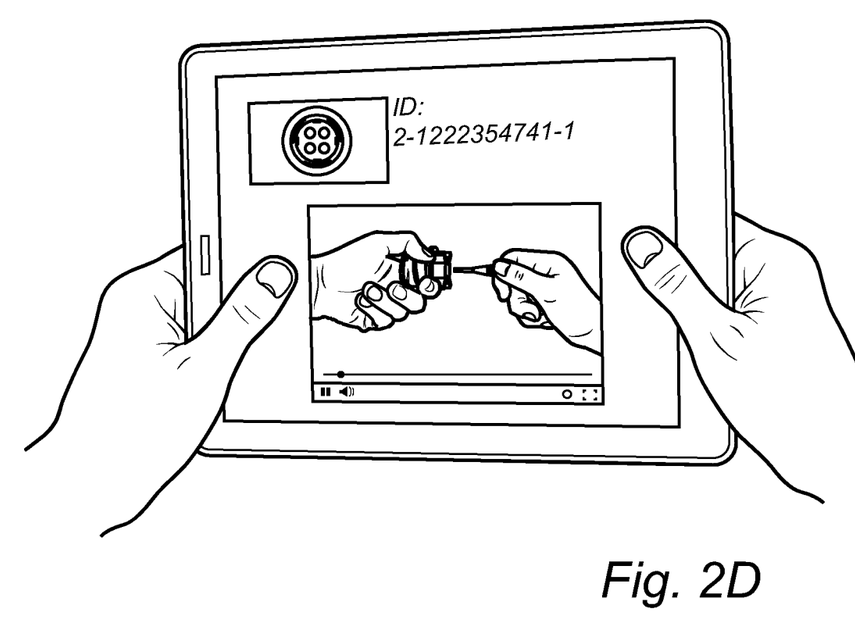

The instruction 210 is displayed within the GUI provided within the display of the tablet 200, for example comprising text and a video sequence for instructing the user/service engineer on how to use the selected removal tool 206. In FIG. 2D it is shown how the pins or posts 204 comprised with the electrical connector 202 have been successfully removed from the electrical connector 202.

Figure 3:
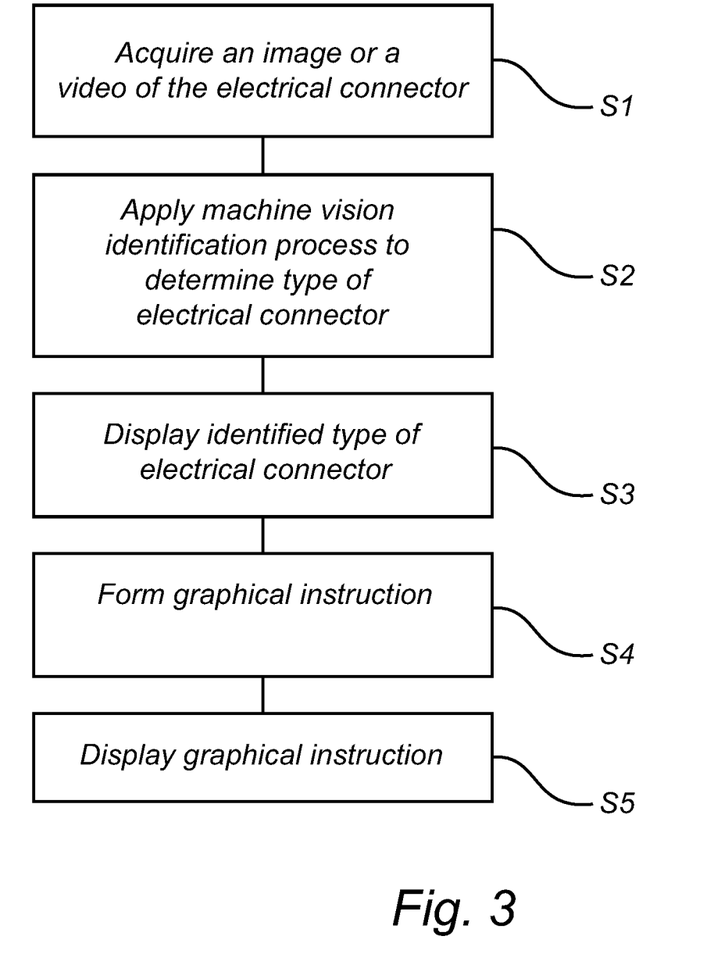
FIG. 3 is a flow chart illustrating the steps of performing the method according to the present disclosure.

In summary and with further reference to FIG. 3, the present invention relates to the method for handling of the operable tool 206 adapted for removal of the terminal pin or post 204 comprised with the automotive electrical connector 202, comprising the steps of acquiring, S1, using the camera 106 comprised with the first electronic device 102, the image/video of the electrical connector 202, applying, S2, the computer implemented machine vision identification process adapted to determine the type of the electrical connector 202, wherein the type of electrical connector 202 is selected from the plurality of predetermined types of electrical connectors, displaying, S2, using the display screen 108 comprised with the first electronic device 102, information relating to the result of the machine vision identification process regarding the identified type of electrical connector 202, forming, S4, the graphical instruction 210 for the identified type of electrical connector 208, and displaying, S5, using the display screen 108 comprised with the first electronic device 102, the graphical instruction 210 for the user for handling the operable tool 206 to remove the pin or post 204 comprised with the electrical connector 202.

By means of the present disclosure, it is possible to rapidly provide e.g. the service engineer with firm instructions of what type of removal tool to select and how to use the selected removal tool for successful removal of the pins or posts comprised with the electrical connector. Specifically, the present disclosure will in an automated manner provide the adequate information needed for the service engineer in completing the pin/post removal task.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for handling of an operable tool adapted for removal of a terminal pin or post comprised with an automotive electrical connector, comprising the steps of:
   acquiring, using a camera comprised with a first electronic device, an image or a video of the electrical connector;
   applying a computer implemented machine vision identification process adapted to determine a type of the electrical connector based on the acquired image or video of the electrical connector, wherein the type of electrical connector is selected from a plurality of predetermined types of electrical connectors;
   displaying, using a display screen comprised with the first electronic device, information relating to a result of the machine vision identification process regarding the identified type of electrical connector;
   forming a displayable graphical instruction based on the identified type of electrical connector, wherein the graphical instruction comprises information to a user on what type of the operable tool to select and how to use the selected removal tool for successful removal of the terminal pins or posts comprised with automotive the electrical connector; and
   displaying, using the display screen comprised with the first electronic device, the graphical instruction for the user for handling the operable tool to remove the pin or post comprised with the electrical connector.

2. The method according to claim 1, wherein the step of forming the graphical instruction comprises selecting one of a plurality of predetermined graphical instructions.

3. The method according to claim 1, wherein the graphical instruction comprises at least one of an image and a video sequence instructing the user for handling the operable tool.

4. The method according to claim 1, wherein the step of applying the machine vision identification process comprises the steps of:
   determining identifiable connector features from the captured image or video of the electrical connector, and
   comparing the determined identifiable features with electrical connector features pre-stored in a database.

5. The method according to claim 1, wherein the machine vision identification process comprises a machine learning component.

6. The method according to claim 1, wherein the machine vision identification process comprises determining an electrical connector category.

7. The method according to claim 4, wherein the step of determining the identifiable connector features is performed using a control unit comprised with the first electronic device.

8. The method according to claim 4, further comprising the step of:
   processing the identifiable electrical connector features for determining the type of connector using a second electronic device, where the first and the second electronic device are connected using a network connection.

9. The method according to claim 8, wherein the second electronic device is a cloud server.

10. The method according to claim 8, further comprising the steps of:
receiving, at the second electronic device, the identifiable electrical connector features, and
transmitting, from the second electronic device to the first electronic device, information relating to the identified type of electrical connector.

11. The method according to claim 4, further comprising the step of:
processing the determining the identifiable electrical connector features for determining the type of electrical connector using the control unit comprised with the first electronic device.

12. A computer vision system adapted to assist in handling of an operable tool adapted for removal of a terminal pin or post comprised with an automotive electrical connector, wherein the computer vision system comprises a first electronic device, the first electronic device comprising a control unit, a camera and a display screen arranged in communication with each other, wherein the computer vision system is adapted to:
acquire, using a camera comprised with a first electronic device, an image or a video of the electrical connector;
apply a computer implemented machine vision identification process adapted to determine a type of the electrical connector based on the acquired image or video of the electrical connector, wherein the type of electrical connector is selected from a plurality of predetermined types of electrical connectors;
display, using a display screen comprised with the first electronic device, information relating to a result of the machine vision identification process regarding the identified type of c electrical connector;
form a displayable graphical instruction based on the identified type of electrical connector, wherein the graphical instruction comprises information to a user on what type of the operable tool to select and how to use the selected removal tool for successful removal of the terminal pins or posts comprised with automotive the electrical connector; and
display, using the display screen comprised with the first electronic device, the graphical instruction for a user for handling the operable tool to remove the pin or post comprised with the electrical connector.

13. The computer vision system according to claim 12, wherein the first electronic device is a handheld electronic device.

14. The computer vision system according to claim 12, wherein the computer vision system is further adapted to:
determine identifiable electrical connector features from the captured image or video of the connector, and
compare the determined identifiable features with electrical connector features pre-stored in a database.

15. The computer vision system according to claim 14, wherein the computer vision system is further adapted to:
process the identifiable electrical connector features for determining the type of electrical connector using a second electronic device, where the first and the second electronic device are connected using a network connection.

16. The computer vision system according to claim 15, wherein the second electronic device is a cloud server.

* * * * *

UNITED STATES PATENT AND TRADEMARK OFFICE
CERTIFICATE OF CORRECTION

PATENT NO. : 10,964,052 B2
APPLICATION NO. : 16/605372
DATED : March 30, 2021
INVENTOR(S) : Sören Karlsson et al.

Page 1 of 1

It is certified that error appears in the above-identified patent and that said Letters Patent is hereby corrected as shown below:

On the Title Page

Item (12) delete "Karlsson" and insert --Karlsson et al.--

Item (72) INVENTORS should read: Sören Karlsson, Vänersborg (SE), Christoffer Weber, Vänersborg (SE)

Signed and Sealed this
Twenty-seventh Day of June, 2023

Katherine Kelly Vidal
*Director of the United States Patent and Trademark Office*